US012513157B2

(12) United States Patent
Mendelowitz et al.

(10) Patent No.: US 12,513,157 B2
(45) Date of Patent: Dec. 30, 2025

(54) ANOMALY DETECTION USING EMBEDDING SPACE REPRESENTATION OF SYSTEM STATES

(71) Applicant: Red Bend Ltd., Hod Hasharon (IL)

(72) Inventors: Shachar Mendelowitz, Hertzeliya (IL); Dror Cohen, Moshav Beit Hanan (IL)

(73) Assignee: RED BEND LTD., Hod Ha'Sharon (IL)

( * ) Notice: Subject to any disclaimer, the term of this patent is extended or adjusted under 35 U.S.C. 154(b) by 251 days.

(21) Appl. No.: 18/254,134

(22) PCT Filed: Nov. 24, 2020

(86) PCT No.: PCT/IL2020/051207
§ 371 (c)(1),
(2) Date: May 23, 2023

(87) PCT Pub. No.: WO2022/113061
PCT Pub. Date: Jun. 2, 2022

(65) Prior Publication Data
US 2024/0031378 A1 Jan. 25, 2024

(51) Int. Cl.
*G06F 21/55* (2013.01)
*G06N 3/08* (2023.01)
*H04L 9/40* (2022.01)

(52) U.S. Cl.
CPC .............................. *H04L 63/1408* (2013.01)

(58) Field of Classification Search
None
See application file for complete search history.

(56) References Cited

U.S. PATENT DOCUMENTS 10,187,409 B1\* 1/2019 Averbuch ................ G06F 21/55
2011/0246409 A1\* 10/2011 Mitra ........................ G06F 17/18
702/179

(Continued)

FOREIGN PATENT DOCUMENTS

CN 109636049 A 4/2019
WO 2022113061 A1 6/2022

OTHER PUBLICATIONS

State Intellectual Property Office of the People's Republic of China, Office Action and Search Report Issued in Application No. 202080107226.5, Mar. 3, 2025, 17 pages. (Submitted with Partial Translation).

(Continued)

*Primary Examiner* — Christopher B Robinson
(74) *Attorney, Agent, or Firm* — McCoy Russell LLP

(57) ABSTRACT

A method, system, and computer program product for anomaly detection using embedding space representation of system states. An anomaly detection model is trained using an anomaly detection algorithm and a plurality of reference vectors obtained using an embedding space representation process configured for mapping to a single point vector in an embedding space each of a plurality of system state snapshots comprised in a training dataset and each capturing during a defined time window a plurality of features of each process operating in the system. Responsive to receiving a testing dataset comprising one or more system state snapshots, one or more vectors in the embedding space are obtained using the embedding space representation process for mapping each system state snapshot in the testing dataset, and the anomaly detection model is used to determine whether a vector of the one or more vectors being indicative of a cyber-attack on the system.

12 Claims, 3 Drawing Sheets

(56) References Cited

U.S. PATENT DOCUMENTS

| | | | |
|---|---|---|---|
| 2015/0269050 A1 | 9/2015 | Filimonov et al. | |
| 2016/0188876 A1* | 6/2016 | Harris | G06F 21/554 |
| | | | 726/23 |
| 2018/0159879 A1 | 6/2018 | Mestha et al. | |
| 2018/0248903 A1 | 8/2018 | Villella et al. | |
| 2018/0248905 A1* | 8/2018 | Côté | H04L 43/045 |
| 2019/0260768 A1 | 8/2019 | Mestha et al. | |
| 2019/0340392 A1 | 11/2019 | Khorrami et al. | |
| 2020/0067969 A1* | 2/2020 | Abbaszadeh | G06N 3/0499 |
| 2020/0235764 A1* | 7/2020 | Patton | G06F 16/29 |
| 2020/0351285 A1 | 11/2020 | Eisenkot et al. | |

OTHER PUBLICATIONS

Alsharnouby, M. et al., "Thread Homeostasis: Real-Time Anomalous Behavior Detection for Safety-Critical Software," ArXiv Cornell University Website, Available Online at https://arxiv.org/abs/1910.01012, Available as Early as Oct. 1, 2019, 74 pages.

European Patent Office, Extended European Search Report Issued in Application No. 20963412.0, Aug. 8, 2024, Germany, 15 pages.

Tobiyama, S. et al., "Malware Detection with Deep Neural Network Using Process Behavior," Proceedings of the 2016 IEEE 40th Annual Computer Software and Applications Conference (COMPSAC), Jun. 10, 2016, Atlanta, Georgia, 6 pages.

Abdelsalam, M., "Online Malware Detection in Cloud Auto-Scaling Systems Using Performance Metrics," Doctor of Philosophy in Computer Science Dissertation Thesis, University of Texas at San Antonio, College of Sciences, Department of Computer Science, Dec. 2018, 24 pages.

ISA Israel Patent Office, International Search Report and Written Opinion Issued in Application No. PCT/IL2020/051207, Feb. 9, 2021, WIPO, 13 pages.

International Bureau of WIPO, International Preliminary Report on Patentability Issued in Application No. PCT/IL2020/051207, Jun. 8, 2023, WIPO, 7 pages.

State Intellectual Property Office of the People's Republic of China, Office Action Issued in Application No. 202080107226.5, Jul. 24, 2025, 14 pages. (Submitted with English Summary).

* cited by examiner

US 12,513,157 B2

ANOMALY DETECTION USING EMBEDDING SPACE REPRESENTATION OF SYSTEM STATES

CROSS-REFERENCE TO RELATED APPLICATIONS

The present application is a U.S. National Phase of International Application No. PCT/IL2020/051207, entitled "ANOMALY DETECTION USING EMBEDDING SPACE REPRESENTATION OF SYSTEM STATES", and filed on Nov. 24, 2020. The entire contents of the above-listed application are hereby incorporated by reference for all purposes.

BACKGROUND

Some embodiments described in the present disclosure relate to data analysis and, more specifically, but not exclusively, to anomaly detection using embedding space representation of system states.

Computer systems control and facilitate many aspects of human life, from text editing to infrastructure resource management such as power plants and traffic lights. Network communication often used by and in some cases even essential to basic functioning of many computer systems makes them susceptible to cyber-attacks, i.e. deliberate attempts to gain unauthorized access to or harm proper operation of the system and/or any of its resources, carried out via a computer network and/or communication network connection. Such attacks may cause serious damages in monetary loss, and in extreme cases even result in grave injury or death. Specifically, in the autonomous vehicles industry, cyber-attacks are of great concern and considered as one of the main challenges to be dealt with.

SUMMARY

It is an object of the present disclosure to describe a system and a method for anomaly detection using embedding space representation of system states.

The foregoing and other objects are achieved by the features of the independent claims. Further implementation forms are apparent from the dependent claims, the description and the figures.

According to one aspect of the disclosed subject matter there is provided a method for identification of cyber-attacks on a system, comprising: obtaining an anomaly detection model trained using an anomaly detection algorithm and a plurality of reference vectors obtained using an embedding space representation process configured for mapping to a single point vector in an embedding space each of a plurality of system state snapshots comprised in a training dataset and each capturing during a defined time window a plurality of features of each process operating in the system; and in response to receiving a testing dataset comprising one or more system state snapshots, obtaining one or more vectors in the embedding space using the embedding space representation process for mapping each system state snapshot in the testing dataset, and using the anomaly detection model to determine whether a vector of the one or more vectors being indicative of a cyber-attack on the system.

Optionally, for each feature of the plurality of features, a plurality of categories of the feature being defined, wherein coordinates of the single point vector being representative of or obtained based on a probability of a process in the defined time window being in a respective category of the plurality of categories of a feature of the plurality of features.

More optionally, coordinates of the single point vector being normalized by a normalization process using at least one statistic derived from the training dataset.

Yet more optionally, the normalization process comprising an action being selected from the group consisting of: division by an average probability; calculation of Z-score.

Optionally, the system being or is comprised in a vehicular system.

According to another aspect of the disclosed subject matter there is provided a method for embedding space representation of system state facilitating anomaly detection, comprising: receiving at least one system state snapshot capturing during a defined time window a plurality of features of each of a set of processes operating in a system; for each of the plurality of features, dividing the set of processes into a plurality of categories; for each category of the plurality of categories, calculating a probability of a process in the defined time window being in the category; and concatenating for each of the plurality of features and for each of the plurality of categories the probability calculated, thereby obtaining a single point vector in an embedding space.

Optionally, the method further comprising normalizing each coordinate of the single point vector based on at least one statistic derived from historic data.

According to yet another aspect of the disclosed subject matter there is provided a computer program product comprising: a non-transitory computer readable storage medium; program instructions for executing, by a processor, a method for embedding space representation of system state facilitating anomaly detection, comprising: receiving at least one system state snapshot capturing during a defined time window a plurality of features of each of a set of processes operating in a system; for each of the plurality of features, dividing the set of processes into a plurality of categories; for each category of the plurality of categories, calculating a probability of a process in the defined time window being in the category; and concatenating for each of the plurality of features and for each of the plurality of categories the probability calculated, thereby obtaining a single point vector in an embedding space.

According to yet another aspect of the disclosed subject matter there is provided a computer program product comprising: a non-transitory computer readable storage medium; program instructions for executing, by a processor, a method for identification of cyber-attacks on a system, comprising: obtaining an anomaly detection model trained using an anomaly detection algorithm and a plurality of reference vectors obtained using an embedding space representation process configured for mapping to a single point vector in an embedding space each of a plurality of system state snapshots comprised in a training dataset and each capturing during a defined time window a plurality of features of each process operating in the system; and in response to receiving a testing dataset comprising one or more system state snapshots, obtaining one or more vectors in the embedding space using the embedding space representation process for mapping each system state snapshot in the testing dataset, and using the anomaly detection model to determine whether a vector of the one or more vectors being indicative of a cyber-attack on the system.

Optionally, for each feature of the plurality of features, a plurality of categories of the feature being defined, wherein coordinates of the single point vector being representative of or obtained based on a probability of a process in the defined time window being in a respective category of the plurality of categories of a feature of the plurality of features.

More optionally, coordinates of the single point vector being normalized by a normalization process using at least one statistic derived from the training dataset.

Yet more optionally, the normalization process comprising an action being selected from the group consisting of: division by an average probability; calculation of Z-score.

Optionally, the system being or is comprised in a vehicular system.

According to yet another aspect of the disclosed subject matter there is provided a method of training an anomaly detection model for identification of cyber-attacks, comprising: receiving a training dataset comprising a plurality of system state snapshots each capturing during a defined time window a plurality of features of each process operating in a system; calculating and applying on the training dataset a transformation mapping each of the plurality of system state snapshots to a single point vector in an embedding space, thereby obtaining a plurality of reference vectors; and training the anomaly detection model using an anomaly detection algorithm and the plurality of reference vectors.

Optionally, for each feature of the plurality of features, a plurality of categories of the feature being defined, wherein coordinates of the single point vector being representative of or obtained based on a probability of a process in the defined time window being in a respective category of the plurality of categories of a feature of the plurality of features.

More optionally, coordinates of the single point vector being normalized by a normalization process using at least one statistic derived from the training dataset.

Optionally, the anomaly detection algorithm being an unsupervised learning algorithm.

More optionally, the anomaly detection algorithm being selected from the group consisting of: isolation forest; one-class support vector machine; deep neural network; replicator neural network; and autoencoder.

Optionally, the training dataset being labeled indicating whether a system state snapshot therein representing system behavior in absence or presence of an attack, wherein the anomaly detection algorithm being a supervised learning algorithm.

Optionally, the training dataset representing normal system behavior in absence of an attack.

According to yet another aspect of the disclosed subject matter there is provided a computer program product comprising: a non-transitory computer readable storage medium; program instructions for executing, by a processor, a method of training an anomaly detection model for identification of cyber-attacks, comprising: receiving a training dataset comprising a plurality of system state snapshots each capturing during a defined time window a plurality of features of each process operating in a system; calculating and applying on the training dataset a transformation mapping each of the plurality of system state snapshots to a single point vector in an embedding space, thereby obtaining a plurality of reference vectors; and training the anomaly detection model using an anomaly detection algorithm and the plurality of reference vectors.

Optionally, for each feature of the plurality of features, a plurality of categories of the feature being defined, wherein coordinates of the single point vector being representative of or obtained based on a probability of a process in the defined time window being in a respective category of the plurality of categories of a feature of the plurality of features.

More optionally, coordinates of the single point vector being normalized by a normalization process using at least one statistic derived from the training dataset.

Optionally, the anomaly detection algorithm being an unsupervised learning algorithm.

More optionally, the anomaly detection algorithm being selected from the group consisting of: isolation forest; one-class support vector machine; deep neural network; replicator neural network; and autoencoder.

Optionally, the training dataset being labeled indicating whether a system state snapshot therein representing system behavior in absence or presence of an attack, wherein the anomaly detection algorithm being a supervised learning algorithm.

Optionally, the training dataset representing normal system behavior in absence of an attack.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
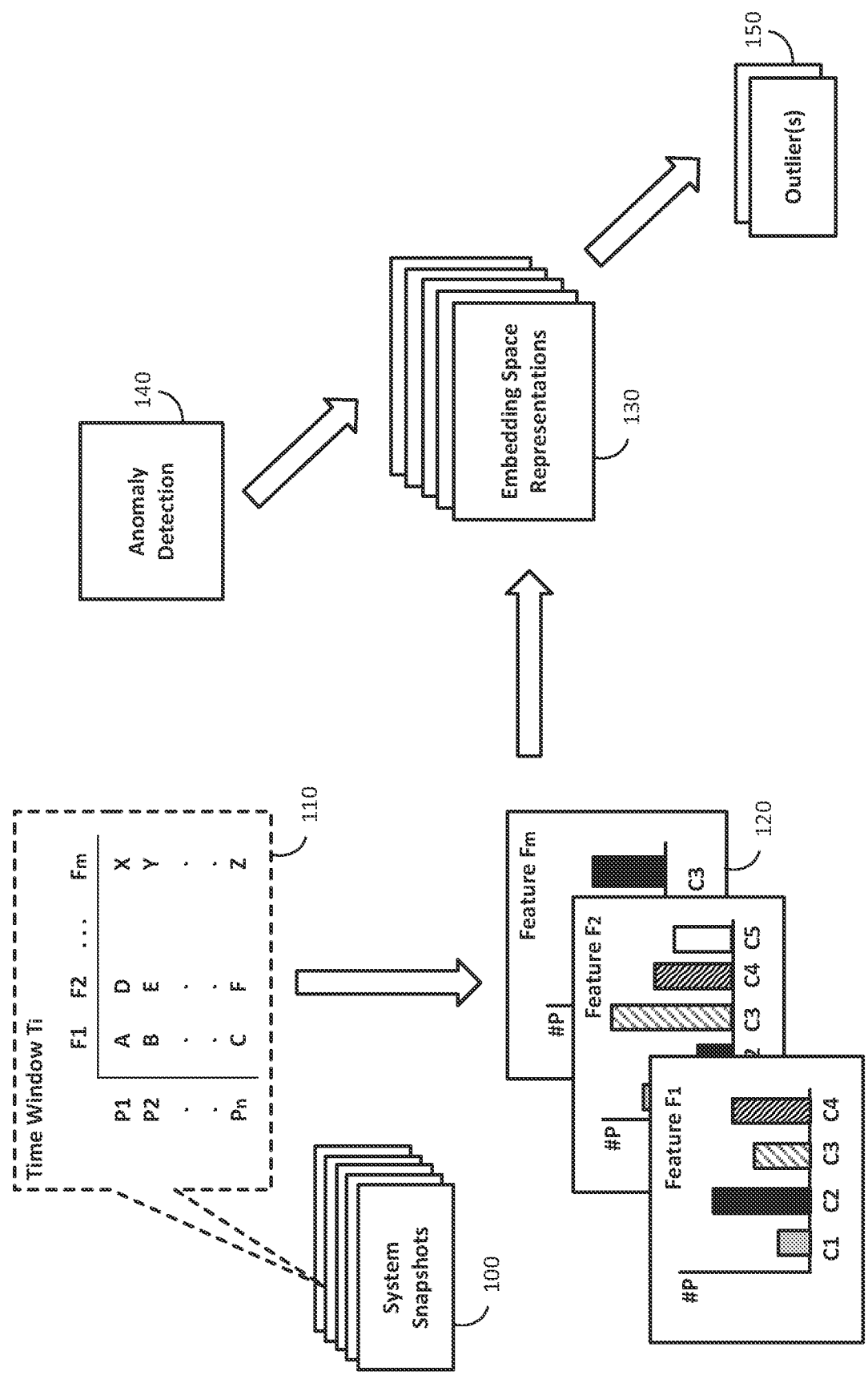
FIG. 1 is a schematic illustration of an exemplary flow of operations for embedding space representation of system states.

Some embodiments described in the present disclosure relate to data analysis and, more specifically, but not exclusively, to anomaly detection using embedding space representation of system states.

The detection of cybersecurity attacks is critically important in many computerized systems. In the context of automotive and/or vehicular systems, for example, such attacks if not detected and mitigated in due course may have fatal results.

In operating systems such as, for example Linux based operation systems, at any given time window, multiple processes may be running in the system. Each of these processes may be described by a set of features. Such features may include, for example: the number of threads the process induces, the number of file descriptors it uses, the number of connections it opens, the amount of CPU and memory resources it utilizes, the number of its voluntary and involuntary context switches, its command line length, and/or any likewise descriptive features and/or combinations thereof.

Anomaly detection systems may identify individual outlier processes using a plethora of anomaly detection algorithms with respect to a common distribution of the descriptive features of each process. Yet, such methodology may not identify abnormal combinations of processes features in a given system state, captured in a certain time window.

In addition to the inability to detect outlier combinations of processes in which each of the individual processes is not an outlier on its own, an approach of identifying individual processes outliers is more likely to induce an excessive number of alerts in certain scenarios.

Assume that a certain system (such as Android OS) has one core process that is constantly active with very unique features. A system detecting abnormal individual processes will constantly identify this process as an outlier due to its unique features, and will constantly generate alerts due to the abundant activity of this core process.

However, when considering the behavior of the entire system it is more informative to alert for abnormal system behavior if the unique features of the specific core process are no longer found in the system, due to inactivation of that process, or if multiple processes suddenly share its unique features.

One technical challenge dealt with by the disclosed subject matter is to detect any cyber-related anomalous behavior in a system, such as an operating system (OS) and/or the like. The attack surface may be wide and it may be hard to know a-priori what, how, and when attacks will occur. Pre-existing methods such as traditional system analysis and machine-learning or deep-learning methods use either raw system parameters and domain knowledge heuristics for unsupervised anomaly detection or using supervised methods, using known malware signatures, but do not model system-wide sky-view behavior. Traditional cybersecurity systems are focused on specific attack vectors and therefore fall short in providing a broad approach less specific per attack vector.

Another technical challenge dealt with by the disclosed subject matter is to generate a representation of combinations of processes in a system. On top of such representation, anomaly detection algorithms may identify outlier combinations of processes, equivalent to abnormal system states.

Yet another technical challenge dealt with by the disclosed subject matter is to incorporate descriptive features of processes in a system into an embedding methodology that represents the collection of individual processes' features in a given time window and captures the system's characteristics or system's state. Such embedding methodology followed by an anomaly detection algorithm may turn valuable in the identification of anomalies in the system's activity, including anomalies generated due to cyber-attacks.

One technical approach is to divide processes into bins of categories determined for each descriptive feature, and count the number of processes in each bin. The count for each bin may be divided by a number of total processes captured in a system state or snapshot, resulting in a value between 0 and 1. The resulting values for each of the bins, conforming to frequencies or probability distributions of the various categories of each descriptive feature may be taken as components of a vector. In this way, each system state or snapshot as depicted by a table or matrix of descriptive features of each process in a system of interest can be transformed into a single row or vector depiction.

In some embodiments, an input comprising a plurality of system snapshots each captured in a given time window in a system to be monitored, may be received. Data for each snapshot may be comprised in a matrix of descriptive features of each process operating in the system during the time window. For example, each row may represent or conform to a different process as identified by a unique identifier (i.e. process ID), while the columns may represent each of the descriptive features of the respective process, such as the number of connections a process opens during the specific time window and/or the like. Each pair of successive time windows in the received input may be either overlapping in part, consecutive, or spaced apart from one another, such that a timeline reflected therein may be either contiguous or non-contiguous.

The descriptive features as in the received input may be binned to categories, such as, for example, based on a cardinal categorization, ordinal categorization, and/or any other categorization. To illustrate, a possible categorization of a feature describing a number of connections opened by each process may produce the following exemplary categories: 0 connections, 1-2 connections, 3-10 connections, and more than 10 connections. Other exemplary categorization methods may be based on or use statistical measures, e.g. quantiles and/or the like.

Given determined categorizations for each descriptive feature, the number of processes sharing each category may be counted and divided by the total number of processes running in a specific time window, reflecting the probability of having a process in each of the categories generated from a single feature. The entire time window data may be thus transformed from a table or matrix to a single row, reflecting a transformation from modeling individual processes to modeling an entire system's state during that time window.

Optionally data produced for each time window, snapshot, state and/or any other likewise depiction of a system comprised in a training set of a plurality of respective instances of such system depictions, may be normalized using data produced and collected for the training set in entirety. For example, the normalization may be carried out by dividing each component corresponding to a category of a feature in each row or vector by a probability of finding a process in the category with respect to the training set and its overall population, or by calculating a Z-score with respect to distributions of probabilities of finding a process in each of the categories in the training set population. It should be appreciated however that mentioning and/or detailed description of any normalization method(s) in the present disclosure are provided herein by way of non-limiting example for illustrative purposes only, and any one of other normalization methods may be employed as well.

Optionally obtained representation of each of the system's states or snapshots as a vector along the different categories, whereby the plurality of snapshots in the training set being mapped to an embedding space where each snapshot being represented as a single dot or point therein, may be used in training of an anomaly detection model. A plurality of vectors in the embedding space as obtained for the training set in whole, either with or without normalization, may be referred to herein by the term "reference vectors".

In some embodiments, training of the anomaly detection model may be carried out by using the plurality of reference vectors and an anomaly detection algorithm, which may take them as input. The anomaly detection algorithm may be an unsupervised learning algorithm, such as for example, one-class support vector machine (SVM), isolation forest, deep neural networks (DNN), replicator neural network (RNN), autoencoders, and/or any other anomaly detection algorithm. The model may be trained on embedding space representations of the training set data, as provided by means of the reference vectors, to detect outliers with respect to distribution of reference vectors comprised in the input used for training the model. The trained model may be used either to generate a binary detection of outliers or to generate an anomaly score for each of system states in a testing dataset to which the model may be applied. Additionally or alternatively, embedding space representation of a system's state in the testing dataset may be provided as output, which may be further incorporated with other embeddings of the system's state, to be used as input to a comprehensive anomaly detection algorithm.

In some embodiments, the training dataset received as input may comprise depictions of the system captured while the system being free of attacks, thus conforming to normal behavior thereof. Optionally the training dataset may further comprise depictions of the system under attack, e.g. using malware and/or likewise offensive tools and/or practices, where each system snapshot in the training dataset being labeled with a label indicating whether it corresponds to an absence or presence of an attack, i.e. to normal or abnormal behavior of the system and processes operating therein. The labeled dataset and embedding space representations thereof may accordingly be used in training the anomaly detection model using a supervised learning algorithm.

Optionally, the system monitored may be or be comprised in a vehicular system, such as for example an operating system or a head unit in an autonomous vehicle.

One technical effect of utilizing the disclosed subject matter is to provide a system-wide view which, rather than trying to catch attack behavior, may enable catching any deviation from normal activity, thus covering the entire attack surface.

Another technical effect of utilizing the disclosed subject matter is to obviate a requirement by a defender of a system to manually list all possible attack vectors and monitor each one separately, as the system-wide view facilitated through utilization of the disclosed subject matter inherently covers the entire attack surface.

Yet another technical effect of utilizing the disclosed subject matter is to facilitate identification of anomalous behavior indicative of a cyber-attack in systems typically exemplifying or being characterized by great regularity or stability in functioning, such as for example automotive or vehicular systems and the like.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to the disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of an exemplary flow of operations for embedding space representation of system states.

As shown in FIG. 1, recorded data of a system, such as a plurality of system snapshots 100, may be received as input. Each of system snapshots 100 may record activity or behavior of the system during a respective time window in which the snapshot was captured. In each time window, and by consequence in its matching snapshot, there may be a set of processes running in the system. Each process can be described by a set of features or attributes. An illustrative exemplary capturing of a time window 110, as may be comprised in system snapshots 100, is also being shown in FIG. 1.

As an illustrative example, a simplified exemplary mock system and mock recorded data are depicted herein in Table 1. In the example, the system is captured in 3 different time windows, denoted 1, 2 and 3. In each of the time windows 1 to 3, there are 10 processes running in the system numbered from 1 to 10. It will be appreciated that in real life scenarios the number of processes in the system may be expected to differ between time windows, and in the mock example herein identical processes number for all time windows is used merely for convenience and ease of understanding. In this simplified example each process is described using 3 different features as follows: a number of connections, a number of threads and a number of file-descriptors that a process uses. As one skilled in the art can readily appreciate, other and/or additional descriptive features for each process in a time window may be tracked and recorded.

In sum, the mock system data frame described herein comprises in total 30 rows, 10 for each time-window, with entries as detailed in Table 1 as follows:

TABLE 1

| Time window | process | #connections | #threads | #file descriptors |
|---|---|---|---|---|
| 1 | 1 | 0 | 4 | 33 |
| 1 | 2 | 1 | 12 | 21 |
| 1 | 3 | 0 | 3 | 50 |
| 1 | 4 | 2 | 23 | 0 |
| 1 | 5 | 5 | 1 | 2 |
| 1 | 6 | 0 | 5 | 15 |
| 1 | 7 | 1 | 6 | 3 |
| 1 | 8 | 0 | 1 | 2 |
| 1 | 9 | 11 | 15 | 100 |
| 1 | 10 | 0 | 2 | 4 |
| 2 | 1 | 0 | 3 | 27 |
| 2 | 2 | 2 | 16 | 25 |
| 2 | 3 | 0 | 2 | 55 |
| 2 | 4 | 3 | 25 | 5 |
| 2 | 5 | 5 | 3 | 4 |
| 2 | 6 | 0 | 7 | 14 |
| 2 | 7 | 4 | 6 | 9 |
| 2 | 8 | 0 | 3 | 0 |
| 2 | 9 | 12 | 19 | 120 |
| 2 | 10 | 0 | 5 | 3 |
| 3 | 1 | 1 | 4 | 21 |
| 3 | 2 | 1 | 11 | 35 |
| 3 | 3 | 0 | 4 | 65 |
| 3 | 4 | 2 | 32 | 6 |
| 3 | 5 | 4 | 2 | 5 |
| 3 | 6 | 4 | 9 | 20 |
| 3 | 7 | 2 | 6 | 6 |
| 3 | 8 | 0 | 0 | 0 |
| 3 | 9 | 12 | 21 | 130 |
| 3 | 10 | 0 | 2 | 3 |

Next, categorization may be determined for each of the features, and the processes in each time window may be divided into bins according to a respective category to which each process belongs, based on its entry of a respective feature being categorized thereby. Feature categories may be either predefined or derived ad hoc based on input analysis, for example using statistics and/or the like. It will be appreciated that the categorization in any event may be presumed stable across different time windows and identical in both embedding space representations of training and testing datasets, whenever a training process of an anomaly detection model being applied. With regard to the mock example herein, an exemplary categorization for the feature of number of connections may consist of the following 3 categories [0, 1-5, 6+], namely a distinction between processes with either zero, one to five, or over six connections, which bins thereof being denoted herein as bin1, bin2 and bin3 respectively. Similarly, exemplary categorization for the feature of number of threads may consist of the following 3 categories [0-9, 10-19, 20+] with bins denoted herein by bin4, bin5 and bin6 respectively, whereas exemplary categorization for the feature of number of file descriptors may consist of the following 3 categories [0-19, 20-89, 90+] with bins denoted bin7, bin 8 and bin9 respectively. It will be appreciated that the exemplary categorizations herein are not meant to be limiting and other categorizations may be utilized with the disclosed subject matter as well; in particular, one skilled in the art may readily appreciate that the number of categories may not necessarily be identical for all features and that any arbitrary number of categories in each feature may be used.

Following determination of categorizations of all features, for each captured time window of system snapshots 100, counts of the processes in each of the bins of the features' categorizations may be obtained, such as shown in FIG. 1 by illustrative exemplary histograms of bin counts 120. To further illustrate, in the mock example using the exemplary categorization herein, counting the number of processes found in each of the categories, at the different time windows, results in the following as summarized in Table 2:

TABLE 2

| Time-window | bin1 | bin2 | bin3 | bin4 | bin5 | bin6 | bin7 | bin8 | bin9 |
|---|---|---|---|---|---|---|---|---|---|
| 1 | 5 | 4 | 1 | 7 | 2 | 1 | 6 | 3 | 1 |
| 2 | 5 | 4 | 1 | 7 | 2 | 1 | 6 | 3 | 1 |
| 3 | 3 | 6 | 1 | 7 | 1 | 2 | 5 | 4 | 1 |

It will be appreciated that by this transformation of the data, a collective view of time windows instead of mere individual processes can be made possible, as each line in the resulting data frame may hold the entire data of that specific time window, instead of representing the data of an individual process. Moreover, it can readily be appreciated that the transformation may increase the width of the table as each feature may be divided to several bins or categories.

Next, the data transformation may continue by dividing each row in the total number of processes found in that time window. It will be appreciated that while in the mock example herein the number of processes found in each time window may be stable, i.e. 10 processes in each time window, in real life scenarios the number of processes in each state of the system may change, as may be expected since the number of application programs and/or operating system processes running on the system may be changing all the time, so at different time points there may be different number of processes found. By dividing with the total number of processes in each time window one may actually compute the probability (or risk) of finding a process in each of the categories. This step may thus account for possible variations in the number of processes at different time windows as contemplated herein. Results of the division of counts by number of processes with respect to the mock example herein are as in following Table 3.

TABLE 3

| Time-window | bin1 | bin2 | bin3 | bin4 | bin5 | bin6 | bin7 | bin8 | bin9 |
|---|---|---|---|---|---|---|---|---|---|
| 1 | 0.5 | 0.4 | 0.1 | 0.7 | 0.2 | 0.1 | 0.6 | 0.3 | 0.1 |
| 2 | 0.5 | 0.4 | 0.1 | 0.7 | 0.2 | 0.1 | 0.6 | 0.3 | 0.1 |
| 3 | 0.3 | 0.6 | 0.1 | 0.7 | 0.1 | 0.2 | 0.5 | 0.4 | 0.1 |

Optionally the probabilities at each category for each time window, such as illustrated in Table 3 for the mock example herein, may be used as embedding space representations, such as 130 in FIG. 1, of data in system snapshots 100, and may be accordingly provided as input to anomaly detection 140 for detecting therein potential outlier(s) 150.

Alternatively, embedding space representations 130 may be obtained by normalization of the probabilities based on distribution and/or other characteristic(s) of a training dataset, as described herein at further detail.

It will be appreciated that detection of outlier(s) 150 by anomaly detection 140 may be performed following a training phase, without regard as to whether or not normalization being applied.

Figure 2:
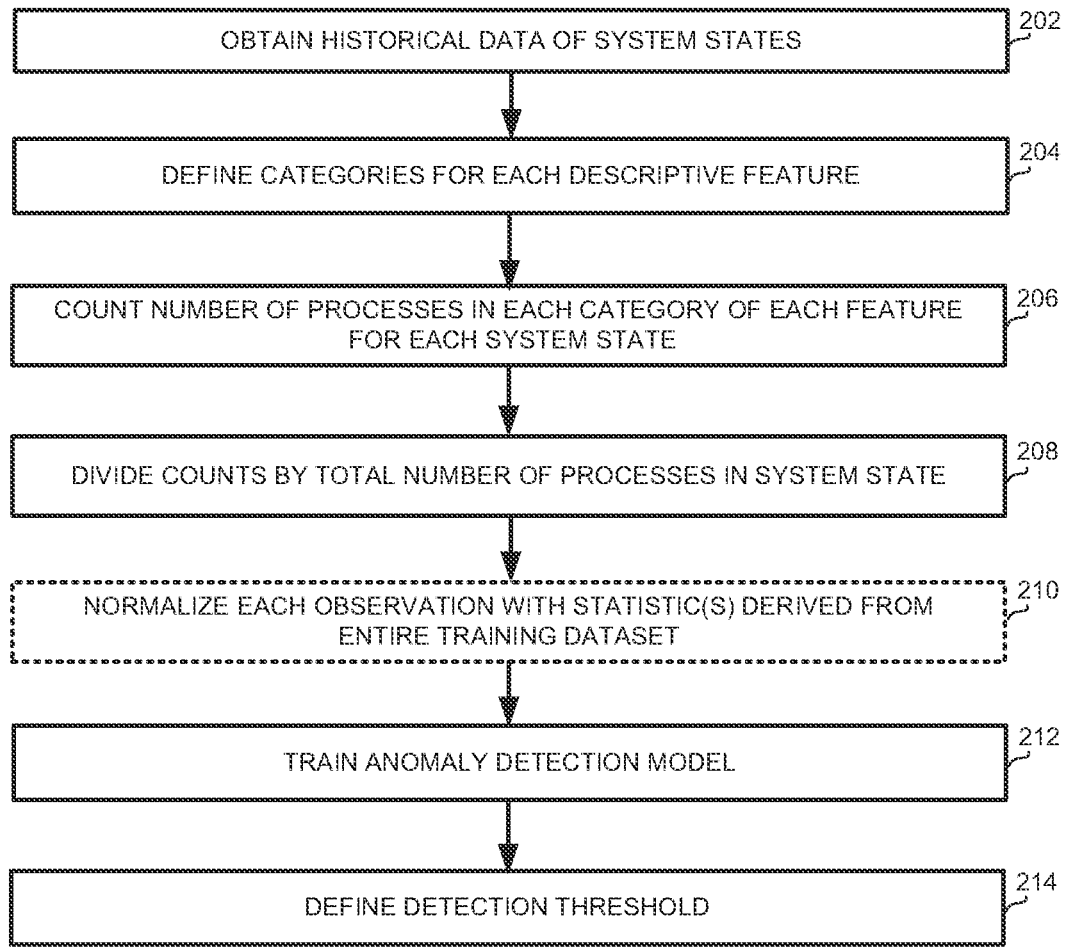
FIG. 2 is a flowchart of a method for obtaining an anomaly detection model using embedding space representation of system states in a training dataset.

Reference is now made to FIG. 2, which is a flowchart of a method for obtaining an anomaly detection model using embedding space representation of system states in a training dataset.

At 202 historical data of system states documenting behavior of a system of interest may be obtained. Each of the system states may comprise a plurality of descriptive features of processes operating in the system during a time window in which the system state or snapshot have been captured. The historical data may be intended for use as training set of an anomaly detection model.

In some embodiments, the historical data may be recorded in the system during a time in which it may be ascertained that no malware attacks being present, such that the recorded data may document normal behavior of the system. Alternatively or additionally, the historical data may be recorded intermittently at times when the system is known to be as either free of any attacks or under deliberate attack(s), and system states comprised therein may be labeled accordingly e.g. as positive and negative examples, or any likewise classification denoting normal and abnormal system states respectively.

At 204, for each of the plurality of features captured in the system states as recorded or otherwise received as input at 202, categories may be defined. The categorizations of features may be aimed at allowing differentiation between processes or types of processes based on a category to which a feature of each process belongs.

At 206, for each category defined at 204 for each of the features, the number of processes in the category may be counted for each of the system states obtained at 202.

At 208, each count as obtained at 206 for each category as defined at 204, may be divided by a total number of processes in a respective system state of the system states obtained at 202, thereby obtaining probabilities or observations of randomly sampled processes being in each of the categories during each time window at which each system state been recorded.

At 210, each of the observations or probabilities obtained at 208 may be normalized, using at least one statistic derived from data gathered for the entire training set, i.e. whole collection of system states as obtained at 202.

It will be appreciated that different types of normalizations may fit for different distributions, and/or for different applications of the disclosed subject matter. It will further be appreciated that normalization may add to embedded representations of system snapshots some prior knowledge about an expectation value at each category. As one skilled in the art can readily appreciate, there may be different ways to perform normalization wherein historical data collected in the training dataset being used in entirety to normalize the probabilities found in each snapshot, such as for example using relative probability (or risk), calculating Z-score, and/or any other normalization method that normalizes a sample by using statistics derived from the population or corpus serving as historical benchmark.

To illustrate, an extension of the mock example herein has additional time windows with entries as detailed in Table 4 which follows.

TABLE 4

| Time window | bin1 | bin2 | bin3 | bin4 | bin5 | bin6 | bin7 | bin8 | bin9 |
|---|---|---|---|---|---|---|---|---|---|
| 1 | 0.5 | 0.4 | 0.1 | 0.7 | 0.2 | 0.1 | 0.6 | 0.3 | 0.1 |
| 2 | 0.5 | 0.4 | 0.1 | 0.7 | 0.2 | 0.1 | 0.6 | 0.3 | 0.1 |
| 3 | 0.3 | 0.6 | 0.1 | 0.7 | 0.1 | 0.2 | 0.5 | 0.4 | 0.1 |
| 4 | 0.4 | 0.4 | 0.2 | 0.6 | 0.3 | 0.1 | 0.6 | 0.3 | 0.1 |
| 5 | 0.5 | 0.4 | 0.1 | 0.7 | 0.2 | 0.1 | 0.5 | 0.3 | 0.2 |
| 6 | 0.3 | 0.5 | 0.2 | 0.8 | 0.1 | 0.1 | 0.5 | 0.4 | 0.1 |
| 7 | 0.3 | 0.6 | 0.1 | 0.8 | 0.1 | 0.1 | 0.5 | 0.4 | 0.1 |
| 8 | 0.4 | 0.4 | 0.2 | 0.6 | 0.2 | 0.2 | 0.6 | 0.3 | 0.1 |
| 9 | 0.5 | 0.4 | 0.1 | 0.7 | 0.2 | 0.1 | 0.5 | 0.3 | 0.2 |
| 10 | 0.5 | 0.4 | 0.1 | 0.7 | 0.2 | 0.1 | 0.6 | 0.3 | 0.1 |

One approach to normalizing the probabilities may be referred to as relative risk (or risk ratio). In this approach, one may simply divide the probability found in each observation by the mean probability found in that category (i.e. bin) throughout the training dataset.

For example, in the mock example herein as described in Table 4, the average probability in bin1 is 0.42. Accordingly, each of the observations in bin1 may be divided by 0.42. Similarly, for all other remaining bins, calculation of an average probability in each bin and division thereby of each observation in that bin may be performed, resulting in entries such as described in the following Table 5:

TABLE 5

| Time window | bin1 | bin2 | bin3 | bin4 | bin5 | bin6 | bin7 | bin8 | bin9 |
|---|---|---|---|---|---|---|---|---|---|
| 1 | 1.19 | 0.89 | 0.77 | 1.00 | 1.11 | 0.83 | 1.09 | 0.91 | 0.83 |
| 2 | 1.19 | 0.89 | 0.77 | 1.00 | 1.11 | 0.83 | 1.09 | 0.91 | 0.83 |
| 3 | 0.71 | 1.33 | 0.77 | 1.00 | 0.56 | 1.67 | 0.91 | 1.21 | 0.83 |
| 4 | 0.95 | 0.89 | 1.54 | 0.86 | 1.67 | 0.83 | 1.09 | 0.91 | 0.83 |
| 5 | 1.19 | 0.89 | 0.77 | 1.00 | 1.11 | 0.83 | 0.91 | 0.91 | 1.67 |
| 6 | 0.71 | 1.11 | 1.54 | 1.14 | 0.56 | 0.83 | 0.91 | 1.21 | 0.83 |
| 7 | 0.71 | 1.33 | 0.77 | 1.14 | 0.56 | 0.83 | 0.91 | 1.21 | 0.83 |
| 8 | 0.95 | 0.89 | 1.54 | 0.86 | 1.11 | 1.67 | 1.09 | 0.91 | 0.83 |
| 9 | 1.19 | 0.89 | 0.77 | 1.00 | 1.11 | 0.83 | 0.91 | 0.91 | 1.67 |
| 10 | 1.19 | 0.89 | 0.77 | 1.00 | 1.11 | 0.83 | 1.09 | 0.91 | 0.83 |

It will be appreciated that in this type of normalization, the data may be centered around 1 (e.g., in the mock example herein the distribution is roughly between 0.6 and 1.7).

Another approach to normalizing the observations may be to calculate Z-score, namely from each observation a mean of each bin may be subtracted and the difference may be divided by a standard deviation of that bin. Results of Z-score normalization applied to the mock example herein are detailed in Table 6.

TABLE 6

| Time window | bin1 | bin2 | bin3 | bin4 | bin5 | bin6 | bin7 | bin8 | bin9 |
|---|---|---|---|---|---|---|---|---|---|
| 1 | 0.87 | −0.59 | −0.63 | 0.00 | 0.32 | −0.48 | 0.95 | −0.62 | −0.47 |
| 2 | 0.87 | −0.59 | −0.63 | 0.00 | 0.32 | −0.48 | 0.95 | −0.62 | −0.47 |
| 3 | −1.31 | 1.76 | −0.63 | 0.00 | −1.27 | 1.90 | −0.95 | 1.45 | −0.47 |
| 4 | −0.22 | −0.59 | 1.46 | −1.49 | 1.90 | −0.48 | 0.95 | −0.62 | −0.47 |
| 5 | 0.87 | −0.59 | −0.63 | 0.00 | 0.32 | −0.48 | −0.95 | −0.62 | 1.90 |
| 6 | −1.31 | 0.59 | 1.46 | 1.49 | −1.27 | −0.48 | −0.95 | 1.45 | −0.47 |
| 7 | −1.31 | 1.76 | −0.63 | 1.49 | −1.27 | −0.48 | −0.95 | 1.45 | −0.47 |
| 8 | −0.22 | −0.59 | 1.46 | −1.49 | 0.32 | 1.90 | 0.95 | −0.62 | −0.47 |
| 9 | 0.87 | −0.59 | −0.63 | 0.00 | 0.32 | −0.48 | −0.95 | −0.62 | 1.90 |
| 10 | 0.87 | −0.59 | −0.63 | 0.00 | 0.32 | −0.48 | 0.95 | −0.62 | −0.47 |

It will be appreciated that in this type of normalization, the data may be centered around 0 (e.g., in the mock example herein the distribution is roughly between −1.5 and 1.9).

In some embodiments, normalization may be skipped completely and the training process may continue directly to 212.

At 212, an anomaly detection model may be trained using the embedding space representations obtained at 210 (or at 208 if normalization being skipped) for each of system states in the historical data (i.e. the training set) obtained at 202. The training may be by use of an unsupervised learning algorithm for anomaly detection, such as for example, one-class support vector machine (SVM), isolation forest, deep neural networks (DNN), replicator neural network (RNN), autoencoders, and/or the like. Alternatively, in case of the training set being labeled, a supervised learning algorithm may be used in training the model. The embedding space representations used for training the model may also be referred to herein as reference vectors.

To illustrate, since each bin or category observation may be a feature in the embedding space to which each system state been mapped after 204 to 210 been performed, the input for the anomaly detection model in the mock example herein comprises 9 features.

It will be appreciated that the model may be trained in this way to look for anomalies not in a single process, but rather for anomalies in an entire system state captured in a given time window. This is due to the data transformation to the embedding space as described herein. The model may not identify a single process as an outlier but rather an entire snapshot of the system as an outlier with respect to "normal" system states.

At 214, a detection threshold may be determined, e.g. based on an outcome or results distribution as obtained from applying the anomaly detection model on the embedding space representations, i.e. reference vectors used as training data at 212. For example, an output of the anomaly detection model may comprise anomaly score, mean absolute error, calculated probability, and/or the like, depending on a type of an anomaly detection algorithm used, and the detection threshold may be determined accordingly based on the output and/or a distribution of the output. To illustrate, assuming an autoencoder neural network being used to look for anomalies and a distribution of the model output for the training data, provided as mean absolute error, being concentrated in a range or section of between [0, 0.25], then an exemplary detection threshold may be set to 0.25, such that a model output above it would be classified as an outlier.

Figure 3:
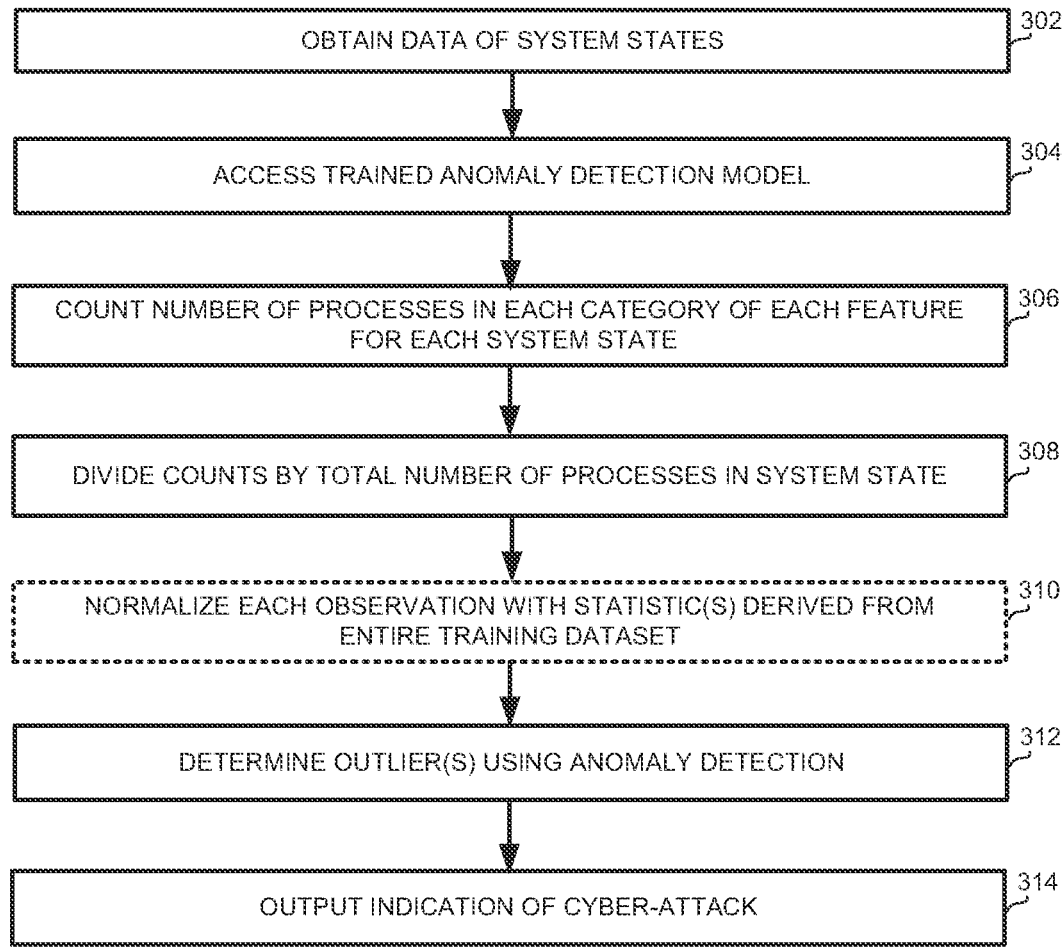
FIG. 3 is a flowchart of a method for anomaly detection using embedding space representation of system states in a testing dataset.

Reference is now made to FIG. 3, which is a flowchart of a method for anomaly detection using embedding space representation of system states in a testing dataset.

At 302, data of system states may be obtained, similarly as in 202 of FIG. 2. The data may be intended for use as testing set in anomaly detection, for example in order to determine whether one or more of the system states may be indicative of a malware attack and/or any other cyber-attack types. The data may be current data recorded in the system of interest, where the historical data as obtained at 202 also arrived from. The data may be similar in form to the historical data or training set of 202, i.e. comprise a same structure of system snapshots, such as for example, same time window durations and sampling rate, and same set of features used to describe the different processes running in a given snapshot.

To illustrate, using the mock example herein, an exemplary snapshot of the system capturing a new time window using a same set of features, in which only 8 processes run in the system instead of 10, is described in the following Table 7.

TABLE 7

| Time window | process | #connections | #threads | #file descriptors |
|---|---|---|---|---|
| new TS1 | 1 | 2 | 16 | 25 |
| new TS1 | 2 | 0 | 2 | 55 |
| new TS1 | 3 | 3 | 25 | 5 |
| new TS1 | 4 | 5 | 3 | 4 |
| new TS1 | 5 | 0 | 7 | 14 |
| new TS1 | 6 | 4 | 6 | 9 |
| new TS1 | 7 | 0 | 3 | 0 |
| new TS1 | 8 | 12 | 19 | 120 |

At 304, access to a trained anomaly detection model may be acquired. The model may be trained in a same or similar manner as in FIG. 2. Along with access to the trained model itself there may be provided parameters relating thereto, such as categorizations of features defined as in 204, normalization method and statistics of the training dataset derived therefor as in 210, detection threshold defined as in 214, and/or the like.

At 306, a number of processes in each category of each of the features may be counted for each of the system states obtained at 302, similarly as in 206.

Referring to the mock example herein, for the exemplary new time window snapshot as described in Table 7, after counting number of processes found in each bin, using same categorization as for the exemplary training set, one row of data that captures the information in the snapshot results as described in following Table 8.

TABLE 8

| Time-window | bin1 | bin2 | bin3 | bin4 | bin5 | bin6 | bin7 | bin8 | bin9 |
|---|---|---|---|---|---|---|---|---|---|
| new TS1 | 3 | 4 | 1 | 5 | 2 | 1 | 5 | 2 | 1 |

At 308, each count as obtained at 306 for each of the system states may be divided by a total number of processes in that system state, similarly as in 208, thereby obtaining a probability of finding a process in each category.

In the mock example herein, as there are 8 processes in the exemplary new snapshot the probabilities resulting from division of the counts are as described in following Table 9.

TABLE 9

| Time-window | bin1 | bin2 | bin3 | bin4 | bin5 | bin6 | bin7 | bin8 | bin9 |
|---|---|---|---|---|---|---|---|---|---|
| new TS1 | 0.375 | 0.5 | 0.125 | 0.625 | 0.25 | 0.125 | 0.625 | 0.25 | 0.125 |

At 310, each observation (i.e. probability) obtained at 308 may be normalized using at least one statistic measure derived for the entire training dataset used for training the model which being accessed at 304, similarly as in the normalization at 210.

To illustrate using the mock example herein, if normalizing for example using relative risk (or risk ratio), after a division by an average probability in the training dataset of each bin separately, the normalized observations for the exemplary new snapshot are as in Table 10 that follows.

TABLE 10

| Time-window | bin1 | bin2 | bin3 | bin4 | bin5 | bin6 | bin7 | bin8 | bin9 |
|---|---|---|---|---|---|---|---|---|---|
| new TS1 | 0.89 | 1.11 | 0.95 | 0.89 | 1.39 | 1.04 | 1.14 | 0.76 | 1.04 |

Else if normalizing for example using Z-score, after subtracting first the averaged probability in each bin, and then dividing by the standard deviation of each bin separately (using averaged probability and standard deviation taken from the training dataset), the normalized observations for the exemplary new snapshot are as in following Table 11.

TABLE 11

| Time-window | bin1 | bin2 | bin3 | bin4 | bin5 | bin6 | bin7 | bin8 | bin9 |
|---|---|---|---|---|---|---|---|---|---|
| new TS1 | −0.49 | 0.59 | −0.10 | −1.13 | 1.11 | 0.12 | 1.42 | −1.66 | 0.12 |

In some embodiments, normalization at 310 may be skipped completely, such as in case it is also skipped during training stage.

At 312, the trained anomaly detection model accessed at 304 may be used to determine (i.e. predict) whether one or more the system states in the data obtained at 302 being outlier(s) with respect to system states found in the training dataset.

To illustrate on the mock example herein, when looking in the numbers representing the exemplary new snapshot TS1 it transpires that these numbers appear quite similar to the distribution encountered in the training dataset. Thus, if anomaly detection model would be used to predict it, most likely that the probability for identifying this snapshot as an outlier will be low. For further illustration, another exemplary new snapshot allegedly more extreme with respect to the training dataset in the mock example herein is described in the following Table 12.

TABLE 12

| Time window | process | #connections | #threads | #file descriptors |
|---|---|---|---|---|
| new TS2 | 1 | 1 | 20 | 115 |
| new TS2 | 2 | 0 | 4 | 95 |
| new TS2 | 3 | 2 | 22 | 6 |
| new TS2 | 4 | 6 | 2 | 5 |

TABLE 12-continued

| Time window | process | #connections | #threads | #file descriptors |
|---|---|---|---|---|
| new TS2 | 5 | 9 | 9 | 20 |
| new TS2 | 6 | 2 | 6 | 6 |
| new TS2 | 7 | 0 | 0 | 0 |
| new TS2 | 8 | 12 | 21 | 123 |

Similarly as in the previous exemplary new snapshot TS1, the exemplary new snapshot TS2 has also 8 processes running. It should also be noted that none of the individual processes in the current time window has values that dramatically differ from individual processes in the training dataset. What makes this specific time window very different from time windows in the training dataset is not the specific individual processes, but the fact that there are more processes working with relatively high number of connections, threads, and/or file descriptors. Therefore, the composition of the processes that are found in this time window is different.

Using embedding space transformation on the current exemplary snapshot TS2, counting the number of processes in each bin, using the same bins as for the training data, results in counts as described in Table 13.

TABLE 13

| Time-window | bin1 | bin2 | bin3 | bin4 | bin5 | bin6 | bin7 | bin8 | bin9 |
|---|---|---|---|---|---|---|---|---|---|
| new TS2 | 2 | 4 | 2 | 5 | 0 | 3 | 4 | 1 | 3 |

Next, calculating the probability of getting a process in each of the bins, by dividing with the total number of processes in the snapshot, being 8 in this case, results in observation as detailed in Table 14.

TABLE 14

| Time-window | bin1 | bin2 | bin3 | bin4 | bin5 | bin6 | bin7 | bin8 | bin9 |
|---|---|---|---|---|---|---|---|---|---|
| new TS2 | 0.25 | 0.50 | 0.25 | 0.63 | 0.00 | 0.38 | 0.50 | 0.13 | 0.38 |

Normalizing the observation of Table 14 using risk ratio, results in embedded representation as described in Table 15.

TABLE 15

| Time-window | bin1 | bin2 | bin3 | bin4 | bin5 | bin6 | bin7 | bin8 | bin9 |
|---|---|---|---|---|---|---|---|---|---|
| new TS2 | 0.60 | 1.11 | 1.89 | 0.89 | 0.00 | 3.13 | 0.91 | 0.38 | 3.13 |

Alternatively, normalizing the observation of Table 14 using Z-score, results in embedded representation as described in Table 16.

TABLE 16

| Time-window | bin1 | bin2 | bin3 | bin4 | bin5 | bin6 | bin7 | bin8 | bin9 |
|---|---|---|---|---|---|---|---|---|---|
| new TS2 | −1.85 | 0.59 | 2.48 | −1.13 | −2.85 | 6.05 | −0.95 | −4.24 | 6.05 |

Comparison of the embedding space representations calculated for each of the two exemplary new snapshots TS1 and TS2 in the mock example herein, using either normalization alternatives, by putting either Tables 10 and 15 or Tables 11 and 16 respectively side by side, can be summarized as in Tables 17 and 18 which follow.

As can be noted from Table 17, which corresponds to the risk ratio normalization, entries for bin3, bin6, bin8 and bin9 of snapshot new TS2 exceed from the boundaries of the training dataset in which numbers distributed roughly between 0.6 to 1.7, as can be seen in Table 5 herein.

TABLE 17

| Time-window | bin1 | bin2 | bin3 | bin4 | bin5 | bin6 | bin7 | bin8 | bin9 |
|---|---|---|---|---|---|---|---|---|---|
| new TS1 | 0.89 | 1.11 | 0.95 | 0.89 | 1.39 | 1.04 | 1.14 | 0.76 | 1.04 |
| new TS2 | 0.60 | 1.11 | 1.89 | 0.89 | 0.00 | 3.13 | 0.91 | 0.38 | 3.13 |

Similarly, in Table 18 which corresponds to the Z-score normalization, entries for bin1, bin3, bin5, bin6, bin8 and bin9 are exceeding minimum and maximum values observed in the training dataset wherein numbers distributed roughly between −1.5 to 1.9, as seen in Table 6.

TABLE 18

| Time-window | bin1 | bin2 | bin3 | bin4 | bin5 | bin6 | bin7 | bin8 | bin9 |
|---|---|---|---|---|---|---|---|---|---|
| new TS1 | −0.49 | 0.59 | −0.10 | −1.13 | 1.11 | 0.12 | 1.42 | −1.66 | 0.12 |
| new TS2 | −1.85 | 0.59 | 2.48 | −1.13 | −2.85 | 6.05 | −0.95 | −4.24 | 6.05 |

As illustrated in Tables 17 and 18, in both calculations of embedding transformation the second evaluated snapshot new TS2 may be identified as an outlier observation with respect to the training dataset, based on equivalent normalization.

Such outlier(s) detection may be accomplished by anomaly detection model obtained using an anomaly detection algorithm and the training dataset. An educated choice of an algorithm and/or normalization method which optimize performance may be made after reviewing enough training data.

It will be appreciated that, while new TS2 can be detected as an outlier by utilizing the disclosed subject matter as described herein, each of the individual processes in new TS2 yet may not seem so different from individual processes found in the training dataset.

The disclosed subject matter may be advantageous in that it may allow to evaluate the composition of the entire system snapshot as a whole, instead of evaluating the individual processes.

Specifically, in a system that has a relative low number of relevant application programs that can run on it, as may be in the case of a vehicle head unit, one may expect to find similar compositions of processes over and over again.

In consequence, the expected sensitivity and specificity in detecting unique compositions, of abnormal system states possibly generated by malwares, may be high, as preliminary experiments corroborate.

Referring back to FIG. 3, in case outlier(s) been detected at 312 by the trained anomaly detection model, at 314 an output to that effect may be provided, such as for example, indication of the system state(s) detected as outlier(s), an alert of suspect to a cyber-attack, and/or the like. Additionally or alternatively, an anomaly score of system states in the testing dataset may be provided as output.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods for embedding space representation of system states, as well as use thereof in detection of cyber-attacks and/or other system anomalies, will be developed and the scope of the term system state embedding is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A method for identification of cyber-attacks on a system, comprising:
    obtaining an anomaly detection model trained using an anomaly detection algorithm and a plurality of reference vectors obtained using an embedding space representation process configured for mapping to a single point vector in an embedding space each of a plurality of system state snapshots comprised in a training dataset and each capturing during a defined time window a plurality of features of each process operating in the system; and
    in response to receiving a testing dataset comprising one or more system state snapshots, obtaining one or more vectors in the embedding space using the embedding space representation process for mapping each system state snapshot in the testing dataset, and using the anomaly detection model to determine whether a vector of the one or more vectors being indicative of a cyber-attack on the system;
    wherein the embedding space representation process comprises:
       for each of the plurality of features, dividing processes operating in the system into a plurality of categories;
       for each category of the plurality of categories, calculating a probability of a process in the defined time window being in the category; and
       concatenating for each of the plurality of features and for each of the plurality of categories the probability calculated, thereby obtaining the single point vector in the embedding space.

2. The method of claim 1, wherein for each feature of the plurality of features, a plurality of categories of the feature being defined, wherein coordinates of the single point vector being representative of or obtained based on a probability of a process in the defined time window being in a respective category of the plurality of categories of a feature of the plurality of features.

3. The method of claim 2, wherein coordinates of the single point vector being normalized by a normalization process using at least one statistic derived from the training dataset, wherein the normalization process comprises:
dividing each coordinate by an average probability of finding a process in a respective category across the training dataset to obtain a relative risk ratio centered around 1; or
calculating a Z-score for each coordinate by subtracting a mean probability and dividing by a standard deviation of finding a process in a respective category across the training dataset to center data around 0.

4. The method of claim 1, wherein the system being or is comprised in a vehicular system.

5. The method of claim 1, further comprising normalizing each coordinate of the single point vector based on at least one statistic derived from historic data.

6. A method of training an anomaly detection model for identification of cyber-attacks, comprising:
receiving a training dataset comprising a plurality of system state snapshots each capturing during a defined time window a plurality of features of each process operating in a system;
calculating and applying on the training dataset a transformation mapping each of the plurality of system state snapshots to a single point vector in an embedding space, thereby obtaining a plurality of reference vectors; and
training the anomaly detection model using an anomaly detection algorithm and the plurality of reference vectors:
wherein the transformation mapping comprises:
for each of the plurality of features, dividing processes operating in the system into a plurality of categories;
for each category of the plurality of categories, calculating a probability of a process in the defined time window being in the category; and
concatenating for each of the plurality of features and for each of the plurality of categories the probability calculated, thereby obtaining the single point vector in the embedding space.

7. The method of claim 6, wherein for each feature of the plurality of features, a plurality of categories of the feature being defined, wherein coordinates of the single point vector being representative of or obtained based on a probability of a process in the defined time window being in a respective category of the plurality of categories of a feature of the plurality of features.

8. The method of claim 7, wherein coordinates of the single point vector being normalized by a normalization process using at least one statistic derived from the training dataset.

9. The method of claim 6, wherein the anomaly detection algorithm being an unsupervised learning algorithm.

10. The method of claim 9, wherein the anomaly detection algorithm being selected from the group consisting of: isolation forest; one-class support vector machine;
deep neural network; replicator neural network; and autoencoder.

11. The method of claim 6, wherein the training dataset being labeled indicating whether a system state snapshot therein representing system behavior in absence or presence of an attack, wherein the anomaly detection algorithm being a supervised learning algorithm.

12. The method of claim 6, wherein the training dataset representing normal system behavior in absence of an attack.

* * * * *